UNITED STATES PATENT OFFICE.

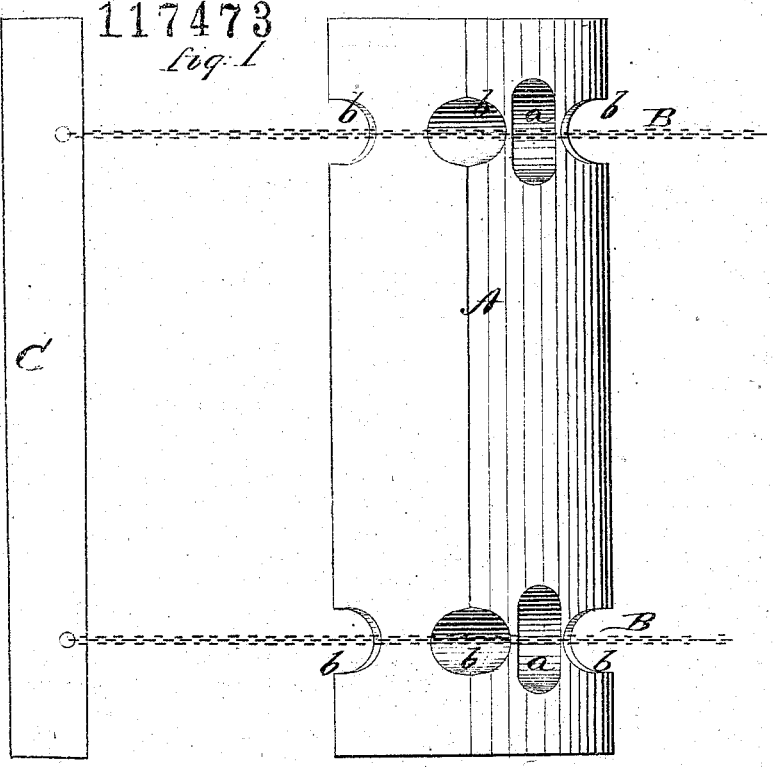
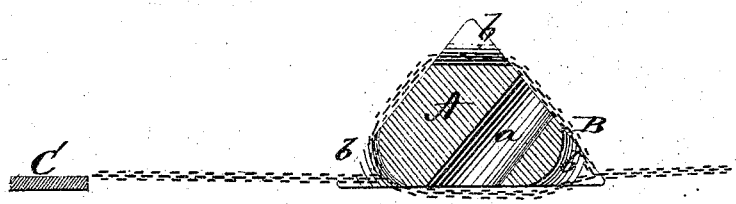

GILLUM SHELTON, OF NORMAL, ILLINOIS.

IMPROVEMENT IN DEVICES FOR PULVERIZING THE SOIL.

Specification forming part of Letters Patent No. 117,473, dated July 25, 1871.

*To all whom it may concern:*

Be it known that I, GILLUM SHELTON, of Normal, in the county of McLean and State of Illinois, have invented certain new and useful Improvements in Land-Drags; and do hereby declare the following to be a full, clear, and exact description thereof, reference being had to the accompanying drawing and to the letters of reference marked thereon.

The nature of my invention consists in the construction and arrangement of a drag for leveling and pulverizing soil for crops, and for breaking down corn-stalks and weeds, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a plan view, and Fig. 2 a transverse vertical section of my drag.

I construct a bar, A, of iron or other metal in triangular shape, having one side of the triangle longer than the other two. This bar may be of any desired length, say from twelve to twenty-four feet. To each end of the bar A I attach a team by means of a chain, B, or rope through the openings *a a*, or around the bar in the grooves *b b*, in the angles, as shown, or by any other convenient mode of attachment. When land is to be made very fine I attach another drag, C, of timber, in the rear, and to level the land one team is driven a little in advance of the other, so that the drag shall be drawn at an angle, say, of from ten to thirty degrees.

Having thus fully described my invention, what I claim as new, and desire to secure by Letters Patent, is—

The triangular drag A, provided with holes *a a* and grooves *b b*, and used with the auxiliary drag C and chain B, substantially as and for the purposes herein set forth.

GILLUM SHELTON.

Witnesses:
 W. M. HATCH,
 CHAS. DEMARYE.